United States Patent [19]
De Doncker et al.

[11] Patent Number: 5,280,421
[45] Date of Patent: Jan. 18, 1994

[54] CURRENT REGULATOR FOR A FOUR-LEGGED THREE-PHASE INVERTER

[75] Inventors: Rik W. A. A. De Doncker, Schenectady; Paul M. Szczesny, Burnt Hills, both of N.Y.

[73] Assignee: General Electric Company, Schenectady, N.Y.

[21] Appl. No.: 899,807

[22] Filed: Jun. 17, 1992

[51] Int. Cl.$^5$ .................................. H02M 7/44
[52] U.S. Cl. ................................. 363/98; 363/17; 363/56; 363/132
[58] Field of Search ............... 363/16, 17, 37, 56, 363/78, 89, 97, 98, 124, 132; 323/222, 224; 364/480, 481, 492

[56] References Cited

U.S. PATENT DOCUMENTS

| | | | |
|---|---|---|---|
| 4,730,242 | 3/1988 | Divan | 363/37 |
| 4,864,483 | 9/1989 | Divan | 363/37 |
| 5,038,267 | 8/1991 | De Doncker et al. | 363/89 |
| 5,172,309 | 12/1992 | De Doncker et al. | 363/132 |
| 5,224,025 | 6/1993 | Divan et al. | 363/16 |

Primary Examiner—Steven L. Stephan
Assistant Examiner—Adolf Berhane
Attorney, Agent, or Firm—Jill M. Breedlove; Marvin Snyder

[57] ABSTRACT

A current regulator for a four-legged, three-phase inverter determines the next optimal, or near-optimal, inverter state in a relatively short time period based on phase current error signals and back-emf's, resulting in low harmonic distortion, reduced current ripple, minimal current stresses, and increased utilization of the available dc bus voltage over a high bandwidth.

2 Claims, 8 Drawing Sheets

CURRENT REGULATOR FOR A FOUR-LEGGED THREE-PHASE INVERTER

This invention was made with Government support under contract 87F3626000 awarded by the Air Force. The U.S. Government has certain rights in this invention.

FIELD OF THE INVENTION

The present invention relates generally to current regulators for power converters and, more particularly, to a current regulator for a four-legged, three-phase inverter which maintains high bandwidth current control for three-phase balanced and unbalanced loads.

BACKGROUND OF THE INVENTION

Inverters used in three-phase balanced systems typically have three inverter legs for modulating output voltages or currents. In particular, to achieve high bandwidth control of ac current, voltage source inverters with fast internal current regulators are often used. For such inverters, load inductances (including stray inductances of motors, transformers and output filter inductors) are part of the active power electronic circuit which functions as a current source. Advantageously, with fast internal current regulation, it is possible to avoid undesirable transients or oscillations due to the load inductances in conjunction with the back electromotive force (emf) or the capacitive filter of the inverter load. Furthermore, fast current regulation allows for instantaneous torque response in motor drives such as those for induction motors, synchronous machines, switched reluctance motors and permanent magnet machines.

Current control strategies for three-phase balanced systems which minimize current ripple, harmonic content, switching frequency and dc bus current ripple are well-known. Unfortunately, however, most three-phase power supplies and voltage-source, current-fed generator systems supply unbalanced loads. A neutral current is required in systems having unbalanced loads in order to maintain a set of three balanced voltages. To this end, a fourth inverter leg is commonly added to control the neutral current. One type of current regulator used for four-legged inverters is the well-known bang-bang controller. Disadvantageously, however, in systems using bang-bang controllers, the total harmonic distortion (THD) and dc bus current ripple are often too high. Other types of current regulators used for four-legged inverters include predictive controllers which select the next most optimal switching state of the inverter by determining all the possible future current trajectories of the system. Such predictive controllers, however, typically require complex digital signal processors.

Accordingly, it is desirable to provide a relatively simple current regulator for a four-legged inverter which maintains high bandwidth current control under unbalanced conditions and furthermore minimizes current ripple, harmonic content and current stresses on the switching devices, while substantially fully utilizing the dc bus voltage.

SUMMARY OF THE INVENTION

A current regulator for a four-legged, three-phase inverter determines the next optimal, or near-optimal, inverter state in a relatively short time period based on phase current error signals and back-emf's. The current regulator includes current comparator means for comparing each respective phase current error signal with a current command and further includes voltage comparator means for comparing each respective back-emf with a switching band voltage. Switching state selection means selects the next switching state of each respective phase leg of the inverter. In particular, a positive switching state is selected for a phase leg if the corresponding current error signal is less than or equal to the current command and the corresponding back-emf is greater than the switching band voltage; a negative switching state is selected for a respective phase leg if the corresponding current error signal is greater than or equal to the current command and the corresponding back-emf is less than the switching band voltage; otherwise, a freewheeling state is selected.

Conflict resolution means ensures that the switching states for each phase leg have the same polarity. In particular, when the switching state selection means selects switching states of opposite polarity for different phase legs, the conflict resolution means selects the optimal, or near-optimal, switching state. Specifically, the conflict resolution means compares the current error signal of each respective phase leg with a current error reference such that if any of the current error signals of the conflicting phases is greater than the current error reference, the switching state selected by the switching state selection means for the phase having the largest current error is allowed, and a freewheeling state is selected for each of the other conflicting phases. On the other hand, if none of the current error signals for the conflicting phases is greater than the current error reference, then the conflict resolution means compares the back-emf's of the conflicting phases such that the switching state selected by the switching state selection means for the phase having the largest back-emf is allowed, and a freewheeling state is selected for each of the other conflicting phases.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
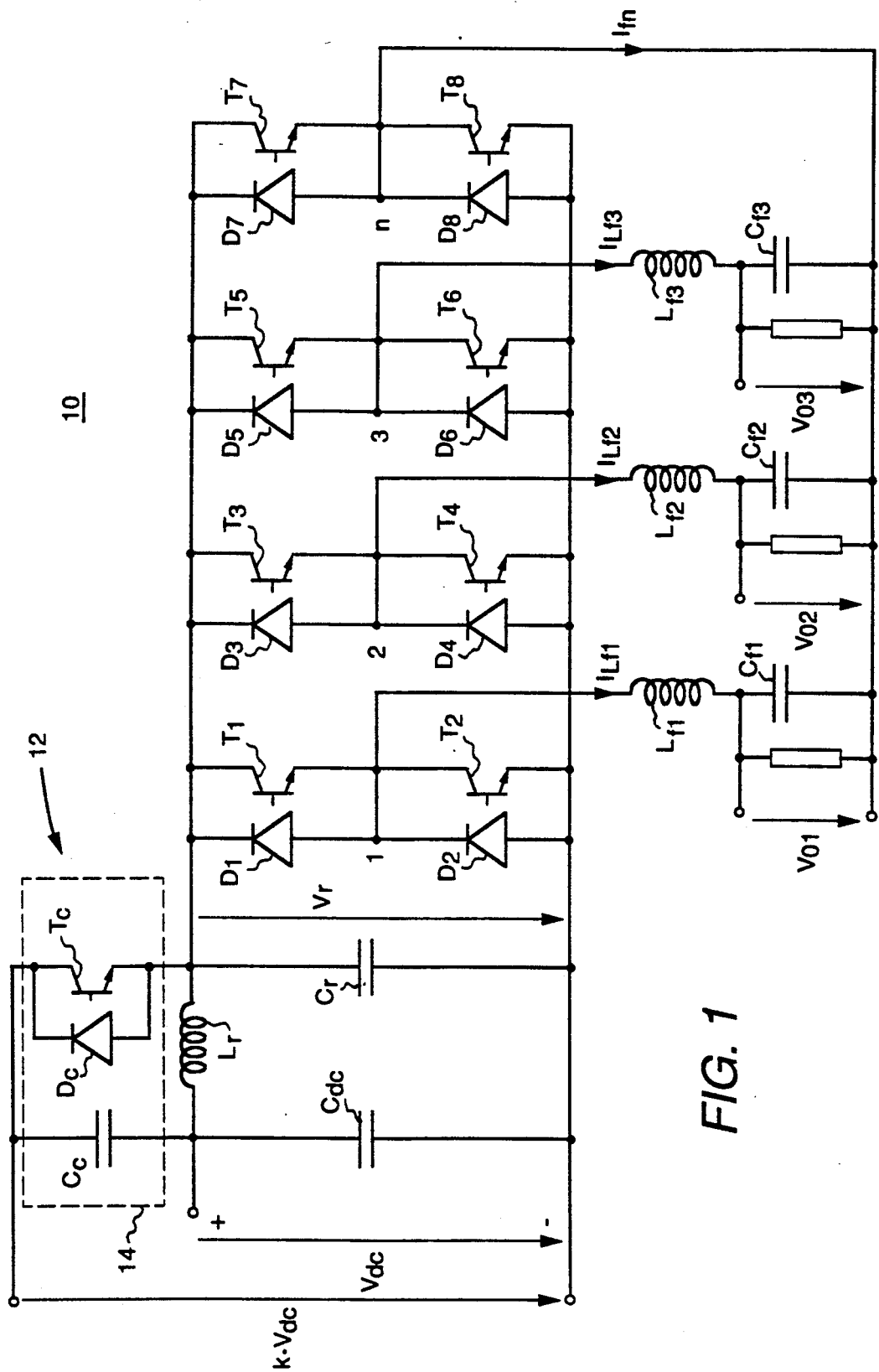
FIG. 1 schematically illustrates a four-legged, three-phase inverter of a type having an active clamped resonant dc link.

FIG. 1 illustrates a typical four-legged, three-phase inverter 10 for supplying power to balanced and unbalanced loads. By way of example, inverter 10 is illustrated as being of a type including an active clamped resonant dc link (ACRDCL), such as that described in commonly assigned U.S. Pat. No. 5,038,267 of R. W. A. A. De Doncker et al., issued Aug. 6, 1991 and incorporated by reference herein. However, it is to be understood that the principles of the present invention are not limited to ACRDCL inverters, but are applicable to any type of inverter supplying balanced and unbalanced loads, including resonant as well as non-resonant inverters.

Each phase leg of inverter 10 is shown as including a pair of switching devices T1-T2, T3-T4, T5-T6, and T7-T8, respectively, coupled in series across a resonant dc link Vr. A diode D1-D8, respectively, is coupled in antiparallel with each switching device T1-T8, respectively. An ACRDCL circuit 12 is coupled to the resonant dc link and includes a resonant circuit, which comprises a relatively small resonant capacitor Cr coupled to a resonant inductor Lr, and an active clamping circuit 14 for maintaining the resonant dc link voltage Vr between zero and a predetermined maximum level k.Vdc. The active clamping circuit 14 comprises a clamp switching device Tc connected in antiparallel with a clamp diode Dc, the antiparallel combination of device Tc and diode Dc being connected in series with a clamp capacitor Cc. The resonant dc link is directly connected via inductor Lr to the dc bus Vdc which is supported by a dc bus capacitor Cdc.

The junctions between the corresponding pairs of switching devices and diodes of each phase leg of inverter 10 is shown as being coupled to the combination of a filter capacitor Cf1, Cf2 and Cf3, respectively, and a filter inductor Lf1, Lf2 and Lf3, respectively. The output load voltage Vo1, Vo2 and Vo3, respectively, of each phase leg is taken across the corresponding filter capacitor Cf1, Cf2 and Cf3, respectively. As indicated, the neutral current Ifn for unbalanced loads flows in the fourth phase leg comprising switches T7 and T8 and diodes D7 and D8.

Figure 2:
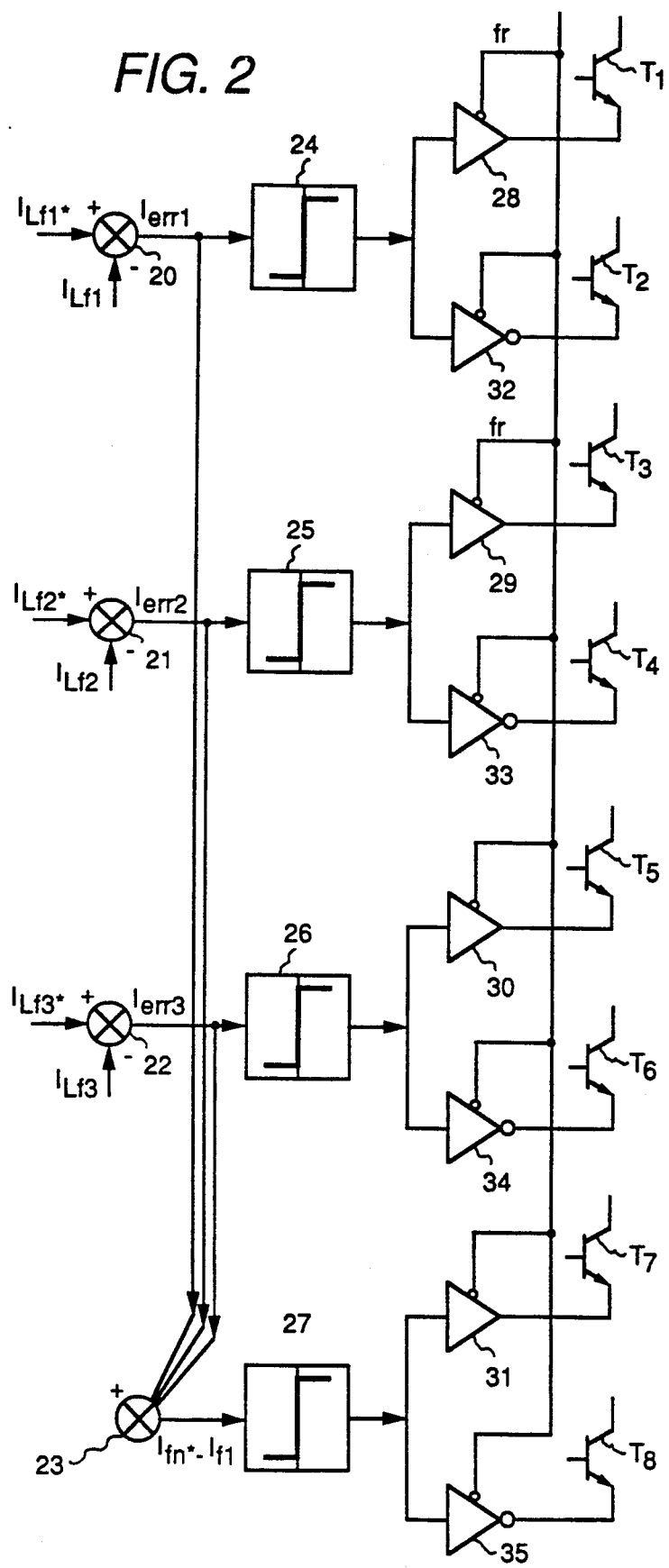
FIG. 2 schematically illustrates a typical bang-bang type current controller for regulating current in a four-legged, three-phase inverter such as that of FIG. 1.

FIG. 2 illustrates a typical bang-bang type controller for regulating current in a four-legged, three-phase inverter such as that of FIG. 1. Each phase current ILf1 through ILf3 is compared in a summer 20-22 to a phase current command ILf1* through ILf3*. The resulting current error signals Ierr1 through Ierr3 are added together in another summer 23, the sum of which represents the neutral current error Ifn*-Ifn. The output error signals from summers 20-23 are each compared in a hysteresis band comparator 24-27, respectively, for determining whether the respective current error signals are within the hysteresis band and furthermore for determining whether the current error signals are positive or negative. The output signals from each respective hysteresis band comparator 24-27 is provided to a buffer 28-31, respectively, and to an inverter 32-35, respectively. In well-known fashion, buffers 28-31 and inverters 32-35 are each clocked at the resonant frequency fr such that the turn-on signals for switches T1-T8 are synchronized with the zero voltage instants of the resonant dc link.

Although a conventional bang-bang type controller, such as that of FIG. 2, is sufficient for regulating current in an inverter, such as that of FIG. 1, the total harmonic distortion (THD) and dc bus current ripple are too high for many applications. Moreover, inverters employing bang-bang controllers typically do not fully utilize the available dc bus voltage.

In accordance with the present invention, a near optimal current regulator for a four-legged inverter, such as, for example, that of FIG. 1, compares the current error signals Ierr and back-emf's Vo, respectively, of each phase and uses the results of these comparisons to determine the next optimal, or near-optimal, inverter switching state in a relatively short time period, resulting in low harmonic distortion, reduced current ripple, minimal current stresses, and increased utilization of the available dc bus voltage over a high bandwidth.

A four-legged inverter, such as, for example, the inverter of FIG. 1, has sixteen possible switching states. The sixteen switching states are illustrated graphically and furthermore are tabulated in FIG. 3. As illustrated, the inverter generates positive, negative or zero voltage for each phase V1n, V2n and V3n. At any given instant, the polarity of the three phase voltages is the same. Indeed, it is impossible to create a positive voltage in one phase simultaneously with a negative voltage in another phase. The neutral leg of the inverter determines the phase voltage polarity.

Figure 4:
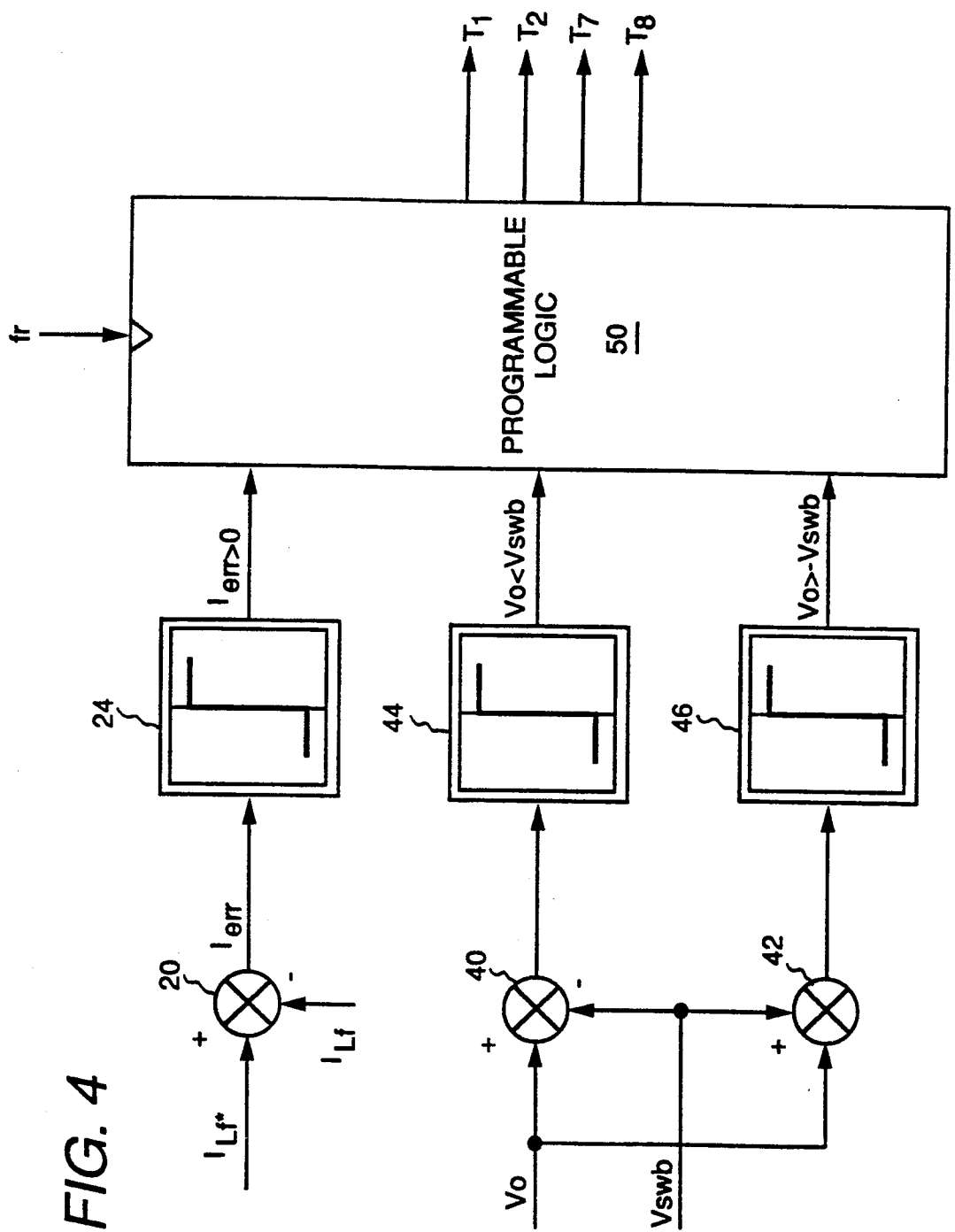
FIG. 4 schematically illustrates a current regulator according to the present invention for regulating current in a single phase of a four-legged, three-phase inverter, such as that of FIG. 1.

FIG. 4 schematically illustrates a current regulator according to the present invention for one phase of the inverter of FIG. 1. Although not shown, it is to be understood that the current regulator circuitry for each of the other phases is the same. As in the conventional bang-bang controller of FIG. 2, each phase current ILf is compared in a summer 20 to a phase current command ILf*. The resulting current error signal Ierr is provided to hysteresis band comparator 24 for determining whether the current error signal is within the hysteresis band and furthermore for determining whether the current error signal is positive or negative.

Figure 5:
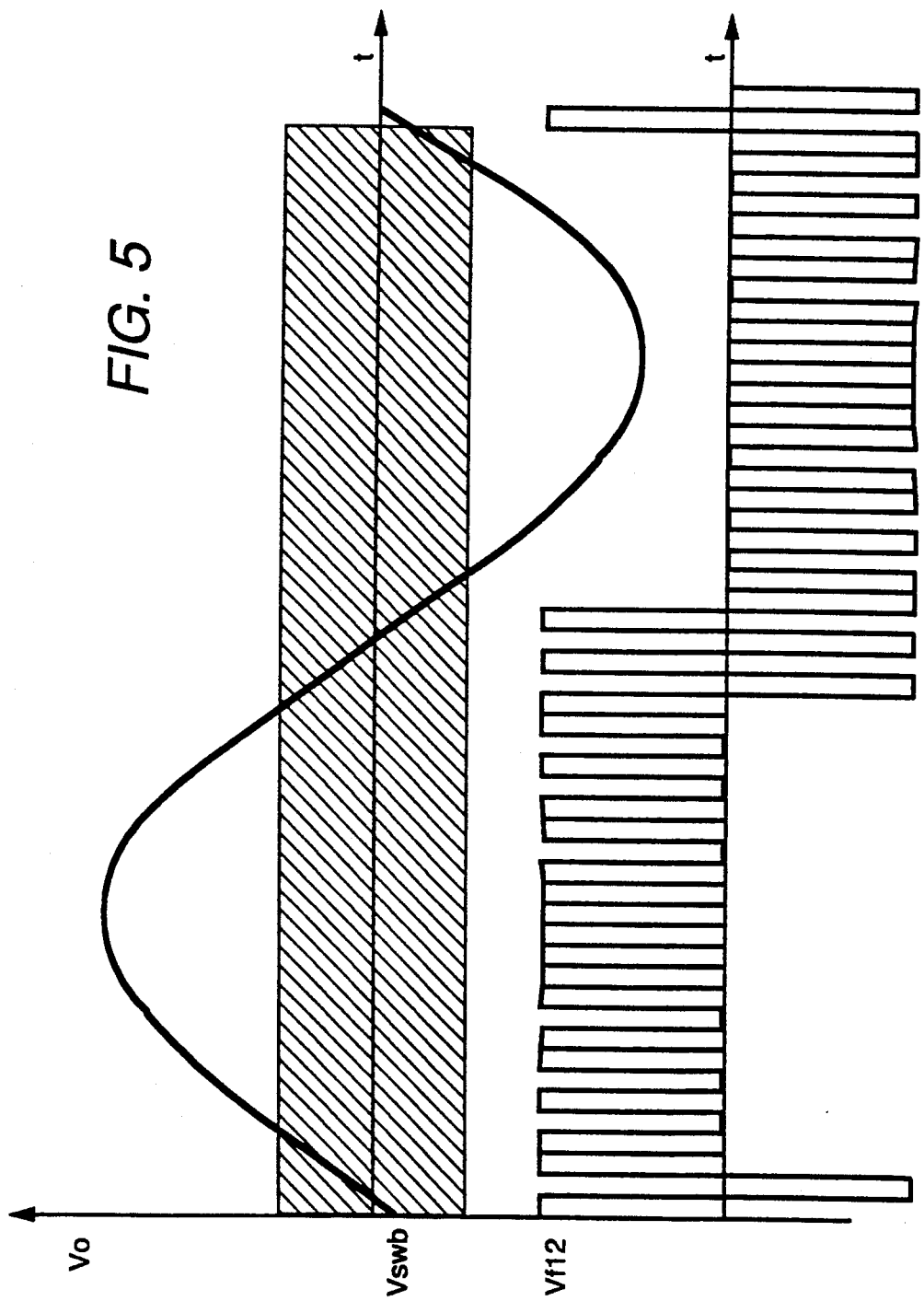
FIG. 5 graphically illustrates a voltage switching band useful in the current regulator of the present invention.

The back-emf Vo for each phase is compared in summers 40 and 42, respectively, to a switching band voltage Vswb. FIG. 5 graphically illustrates the switching band voltage Vswb. In particular, for low back-emf, a voltage switching band is provided around the zero voltage crossing where free bang-bang switching is allowed such that the phase current is allowed to reverse polarity. The output voltage signals from summers 40 and 42 are provided to hysteresis band comparators 44 and 46, respectively, for determining whether the back-emf is within the switching band.

Figure 6A:
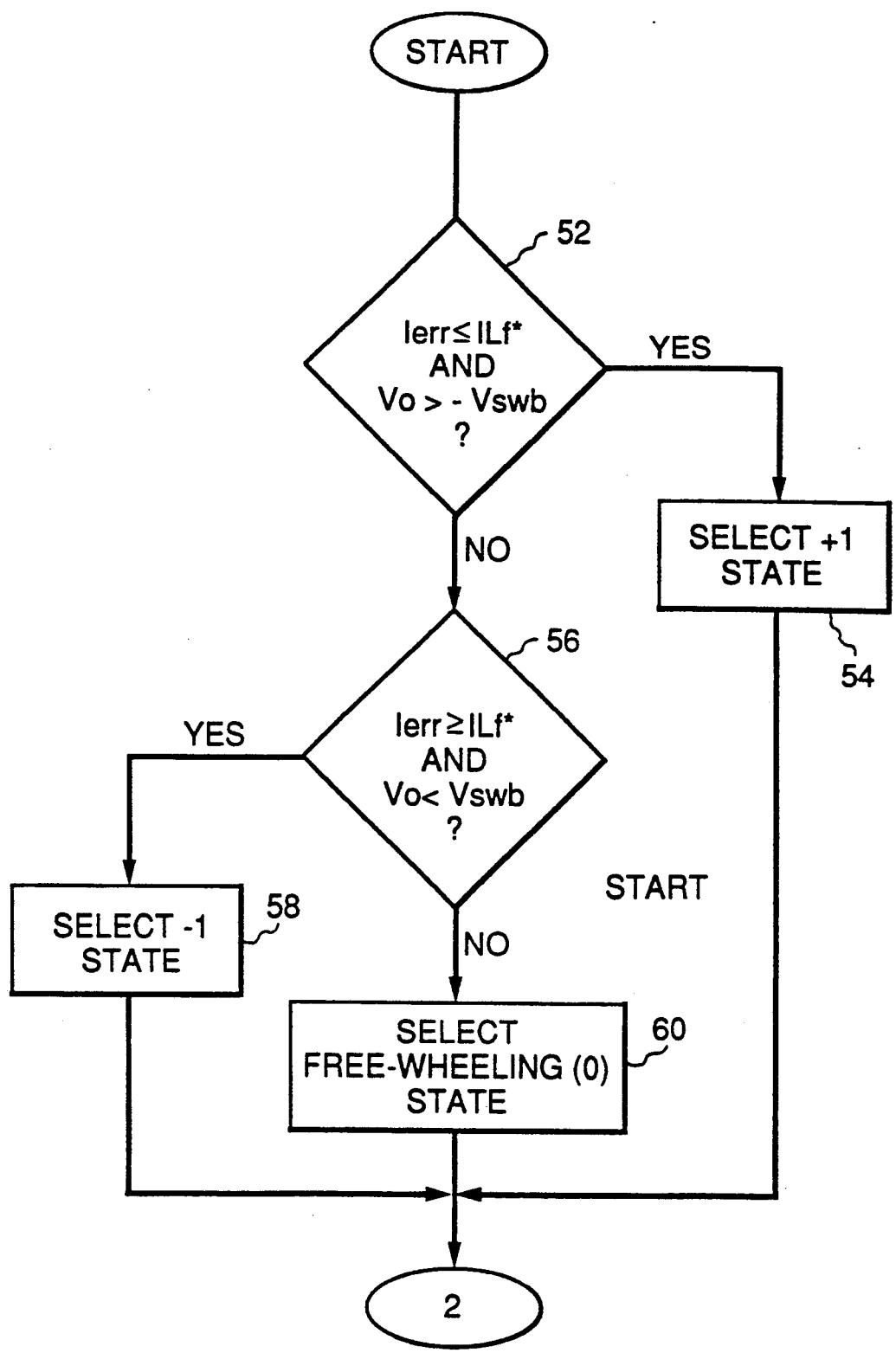
FIGS. 6a and 6b are flow charts illustrating the current regulator logic of the present invention.
Figure 6B:
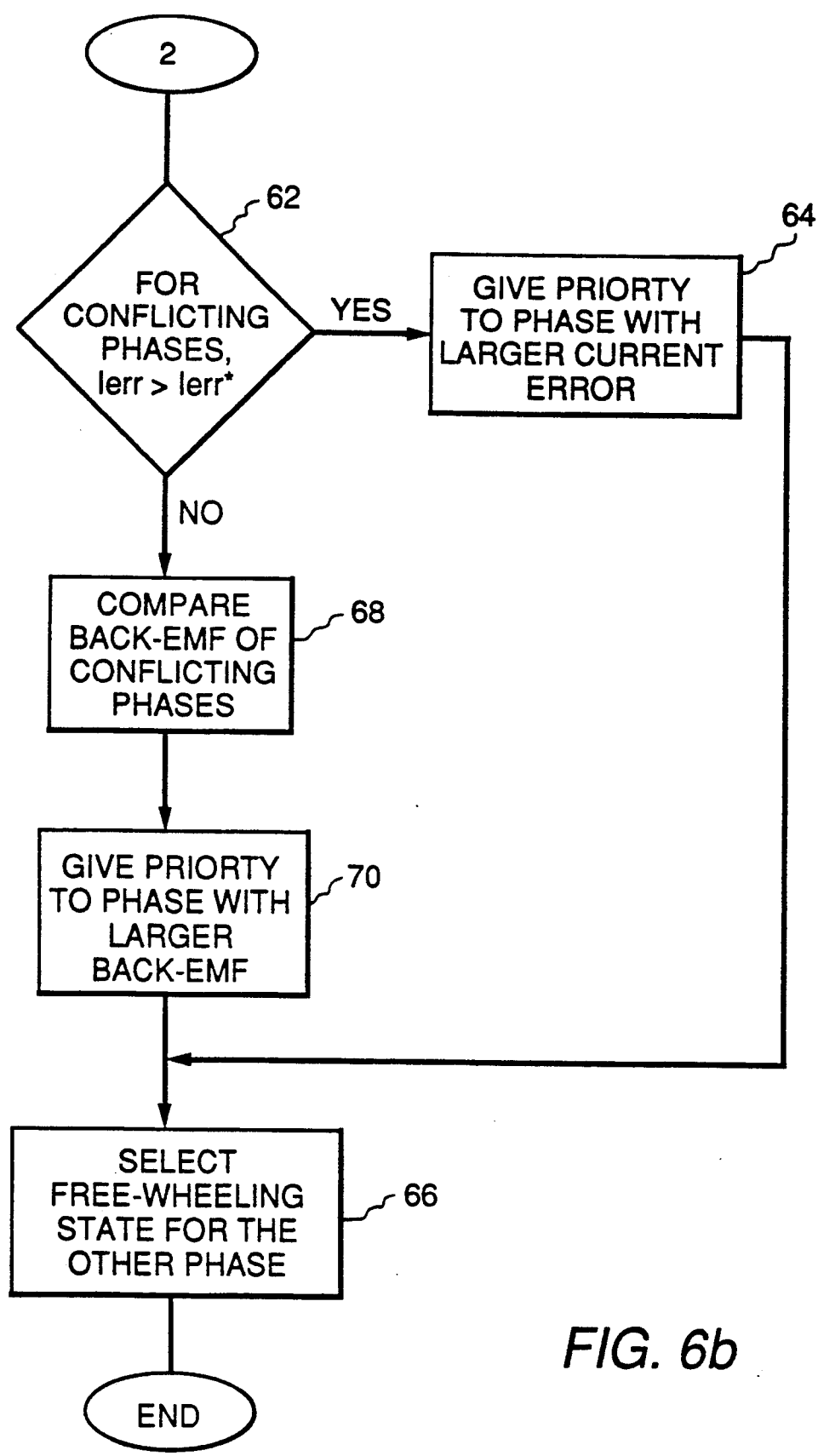

The output signals from hysteresis band comparators 24, 44 and 46 are provided to a logic block 50 for selecting the next inverter switching state. Flow charts for logic block 50 are illustrated in FIGS. 6a and 6b. As a first step 52 in FIG. 6a, a test is made to determine: (1) whether the current error signal Ierr is less than or equal to the current command ILf*; and (2) whether the back-emf Vo is greater than the negative switching band voltage −Vswb. If both conditions of step 52 are satisfied, then a positive switching state, i.e., a positive output voltage is selected, as indicated in step 54. For a positive switching state, T1 and T8 are on, and T2 and T7 are off. On the other hand, if both conditions of step 52 are not satisfied, then operation proceeds to step 56 wherein another test is made to determine: (1) whether the current error signal Ierr is greater than the current command ILf*; and (2) whether the back-emf Vo is less than the positive switching band voltage +Vswb. If both conditions of step 56 are satisfied, then a negative switching state, i.e., a negative output voltage is selected, as indicated in step 58. For a negative switching state, T2 and T8 are on, and T1 and T7 are off. On the other hand, if both conditions of step 56 are not satisfied, then a zero, i.e., freewheeling, state is selected, as indicated in step 60, wherein either T1 and T7 or T2 and T8 are on, and the corresponding lower or upper switching devices are off. Although the flow chart of FIG. 6a has been described with reference to the phase leg of inverter 10 having switching devices T1 and T2, it is to be understood that the same algorithm is employed to determine the switching states of the other phase legs of the inverter.

Figure 3:
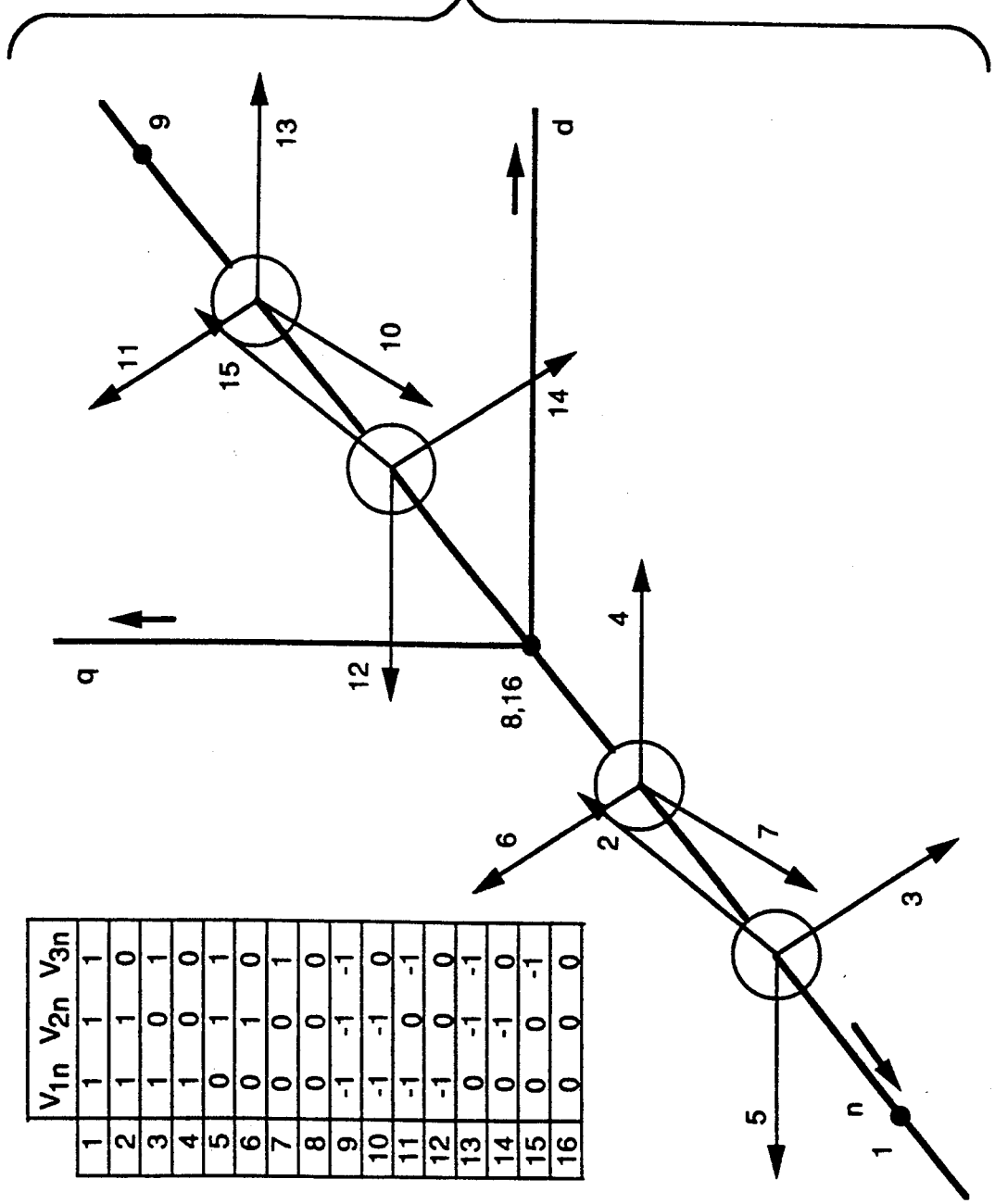
FIG. 3 illustrates the dqn space vectors associated with the possible inverter switching states of the inverter of FIG. 1 graphically and in tabular form.

Whenever the algorithm of the flow chart of FIG. 6a leads to one of the sixteen inverter states given in FIG. 3, the inverter switches are switched accordingly. However, whenever the algorithm of FIG. 6a leads to an "impossible" inverter switching state, i.e., wherein a positive and negative voltage are selected for two different phases, additional logic circuitry is provided to resolve the conflict and thus to choose the optimal, or near-optimal, switching state. This additional logic is represented in the flow chart of FIG. 6b and in the schematic illustration of FIG. 7.

In FIG. 6b, step 62 involves determining whether the error current signal for each of the conflicting phases is greater than a predetermined current error reference Ierr*. If any of the current error signals satisfies the condition of step 62, then the phase having the largest current error signal has priority, as indicated in step 64; i.e., the switching state for the phase having priority is selected according to the flow chart of FIG. 6a; and a freewheeling state is selected for each of the other conflicting phases in step 66. The test of step 62 is thus accommodates large differences between the current error reference and the current error signals.

If none of the current error signals satisfies the condition of step 62, then the back-emf's Vo of the conflicting phases are compared in step 68; and step 70 gives priority to the phase with the largest back-emf. This selection is based on the fact that a larger back-emf leads to a faster current change and, consequently, to a faster current error buildup during freewheeling.

Figure 7:
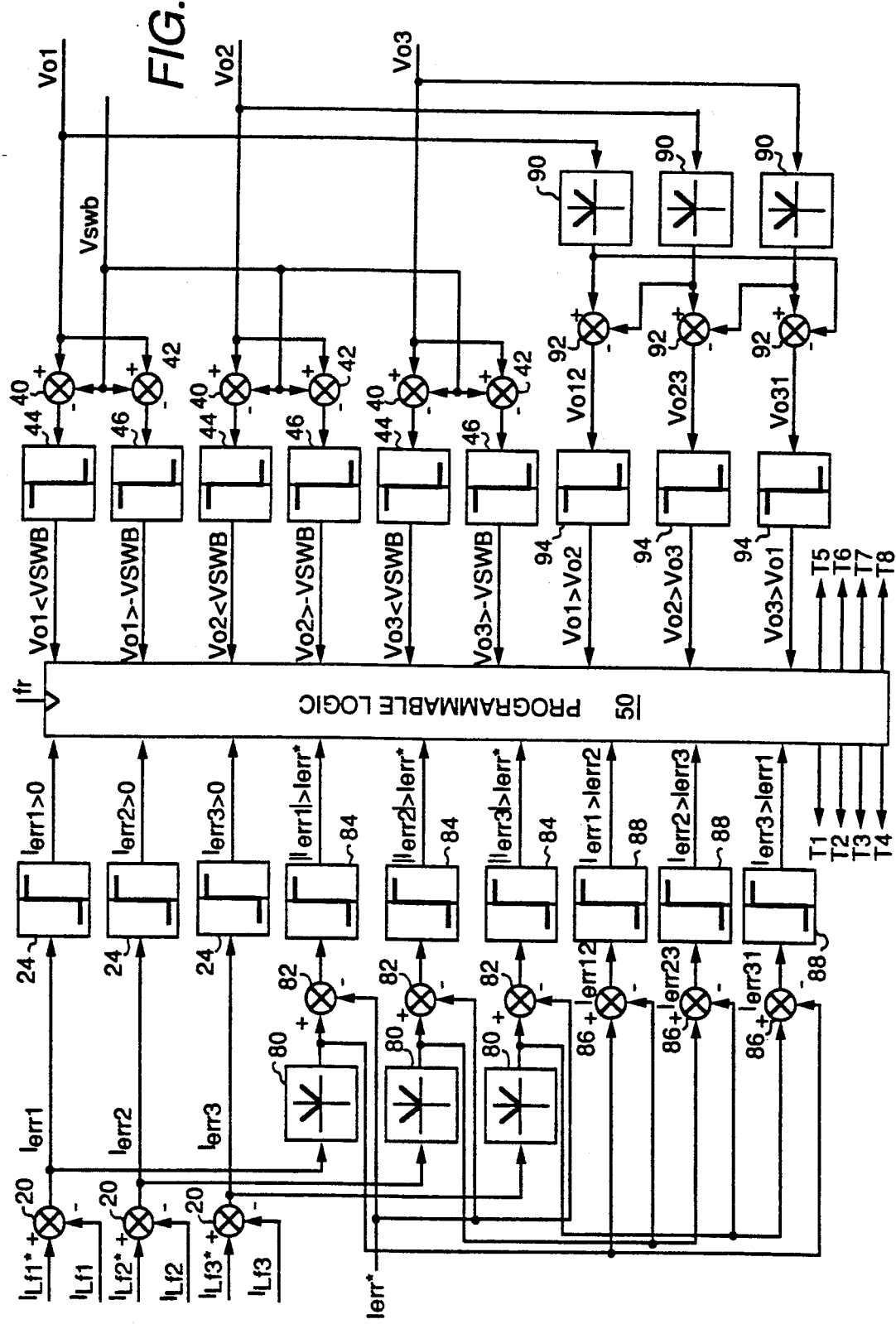
FIG. 7 schematically illustrates a current regulator according to the present invention for regulating current in the three phases of a four-legged, three-phase inverter, such as that of FIG. 1.

FIG. 7 schematically illustrates the logic circuit inputs to programmable logic block 50 for regulating current in the three phases of the four-legged, three-phase inverter of FIG. 1. As shown, the circuitry illustrated in FIG. 4 has been duplicated for each phase in FIG. 7. In addition, FIG. 7 includes circuitry for providing the appropriate inputs to programmable logic block 50 for resolving conflicts in accordance with the flow chart of FIG. 6b. In particular, to compare each current error signal Ierr1 through Ierr3 to the current error reference Ierr*, as indicated in step 62 of FIG. 6b, each respective current error signal is provided first to an absolute value block 80, the output signal of which is compared in a summer 82 to the current error reference Ierr*. The output signal from each respective summer 82 is provided to a hysteresis comparator 84 for determining whether the absolute value of the respective current error signal is greater than the current error reference. The output signal from each hysteresis comparator 84 is provided to programmable logic block 50.

In order to compare the current error signals of conflicting phases in accordance with the flow chart of FIG. 6b, and thus give priority to the phase with the larger current error signal as indicated in step 64 of FIG. 6b, the output signal from each respective absolute value block 80 is compared in a summer 86 to the current error signal of the next respective, i.e., adjacent, phase, resulting in current signals Ierr12, Ierr23 and Ierr31, respectively. The output signal from each respective summer 86 is provided to a hysteresis comparator 88 for determining which adjacent phase has the larger current error signal. The output signal from each hysteresis comparator 88 is provided to programmable logic block 50.

In order to compare the back-emf's Vo of conflicting phases in accordance with step 68 of the flow chart of FIG. 6b, the back-emf's vol through Vo3 are each provided to an absolute value block 90. The output signal from each respective absolute value block is compared in a summer 92 to the back-emf of the adjacent phase, resulting in voltage signals Vo12, Vo23 and Vo31, respectively. The voltage signals Vo12, Vo23 and Vo31 are each provided to a respective hysteresis comparator 94 for comparing the back-emf's of the adjacent phases. The output signal from each hysteresis comparator 94 is provided to programmable block 50.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A current regulator for a four-legged, three-phase inverter, comprising:

means for generating a current error signal for each respective phase leg of said inverter;

means for measuring the back-emf of each respective phase leg of said inverter;

current comparator means for comparing each respective current error signal with a current command;

voltage comparator means for comparing each respective back-emf with a switching band voltage;

switching state selection means for selecting the next switching state of each respective phase leg of said inverter, said switching state selection means selecting a positive switching state for a respective phase leg if the corresponding current error signal is less than or equal to said current command and the corresponding back-emf is greater than said switching band voltage, said switching state selection means selecting a negative switching state if the corresponding current error signal is greater than or equal to said current command and the corresponding back-emf is less than said switching band voltage, said switching state selection means otherwise selecting a freewheeling state;

conflict resolution means for ensuring that the switching states for each phase leg have the same polarity, said conflict resolution means resolving conflicts between phase legs for which said switching state selection means has selected switching states of opposite polarity as follows:

said conflict resolution means comparing the current error signal of each respective phase leg with a current error reference such that if any of the current error signals of the conflicting phases is greater than the current error reference, the switching state selected by said switching state selection means for the phase having the largest current error is allowed, a freewheeling state being selected for each of the other conflicting phases;

said conflict resolution means comparing the back-emf's of the conflicting phases if the current error signal for each of the conflicting phases is less than the current error reference, such that the switching state selected by said switching state selection means for the phase having the largest back-emf is allowed, a freewheeling state being selected for each of the other conflicting phases.

2. A method for regulating current in a four-legged, three-phase inverter, comprising:

(a) generating a current error signal for each respective phase leg of said inverter;

(b) measuring the back-emf of each respective phase leg of said inverter;

(c) comparing each respective current error signal with a current command;

(d) comparing each respective back-emf with a switching band voltage;

(e) selecting the next switching state of each respective phase leg of said inverter as follows:

(1) selecting a positive switching state for a respective phase leg if the corresponding current error signal is less than or equal to said current command and the corresponding back-emf is greater than said switching band voltage;

(2) selecting a negative switching state if the corresponding current error signal is greater than or equal to said current command and the corresponding back-emf is less than said switching band voltage;

(3) otherwise selecting a freewheeling state;

(f) ensuring that the switching states for each phase leg have the same polarity by resolving conflicts between phase legs for which said selecting step (e) has resulted in switching states of opposite polarity as follows:

(1) comparing the current error signal of each respective phase leg with a current error reference such that if any of the current error signals of the conflicting phases is greater than the current error reference, the switching state selected in said selecting step is allowed, a freewheeling state being selected for each of the other conflicting phases;

(2) comparing the back-emf's of the conflicting phases if the current error signal for each of the conflicting phases is less than the current error reference, such that the switching state selected in said selecting step for the phase having the largest back-emf is allowed, a freewheeling state being selected for each of the other conflicting phases.

* * * * *